June 26, 1956
F. K. H. NALLINGER
2,751,992
UNIT POWER PLANT AND AXLE UNIT
SUSPENSION IN MOTOR VEHICLES
Filed July 28, 1950
3 Sheets-Sheet 1
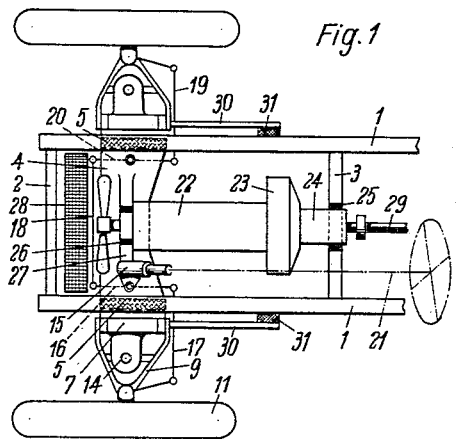
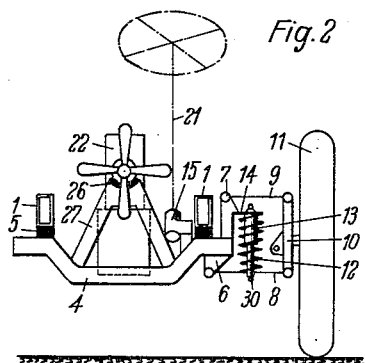
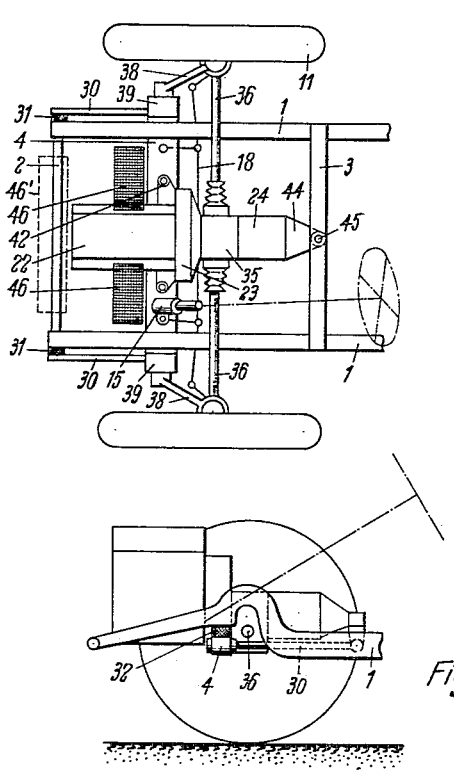
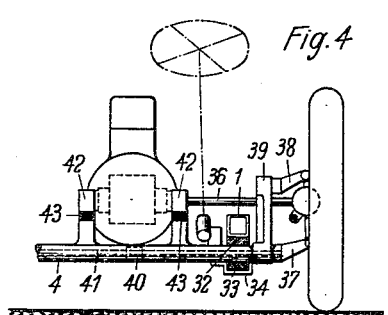
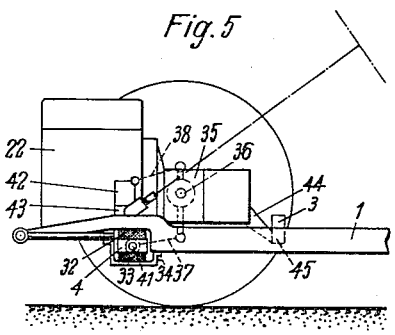
INVENTOR.
FRIEDRICH K.H. NALLINGER
By Dicke and Padlon
ATTORNEYS

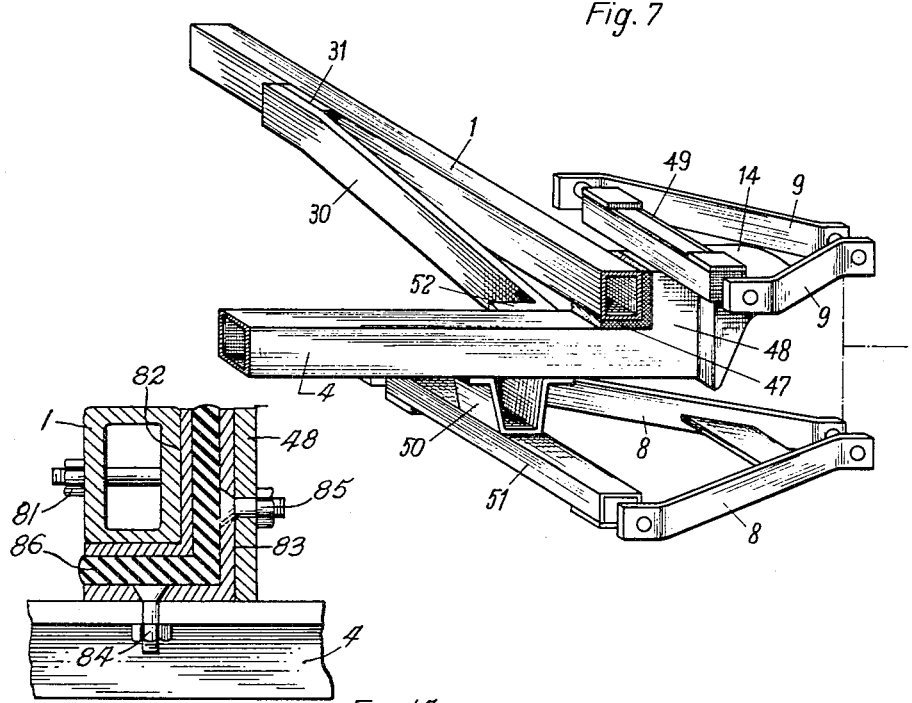
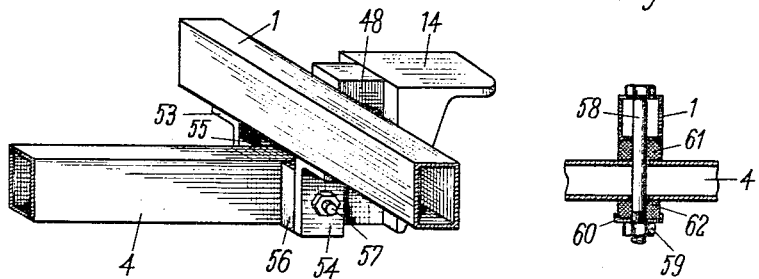

June 26, 1956     F. K. H. NALLINGER     2,751,992
UNIT POWER PLANT AND AXLE UNIT
SUSPENSION IN MOTOR VEHICLES
Filed July 28, 1950     3 Sheets-Sheet 3
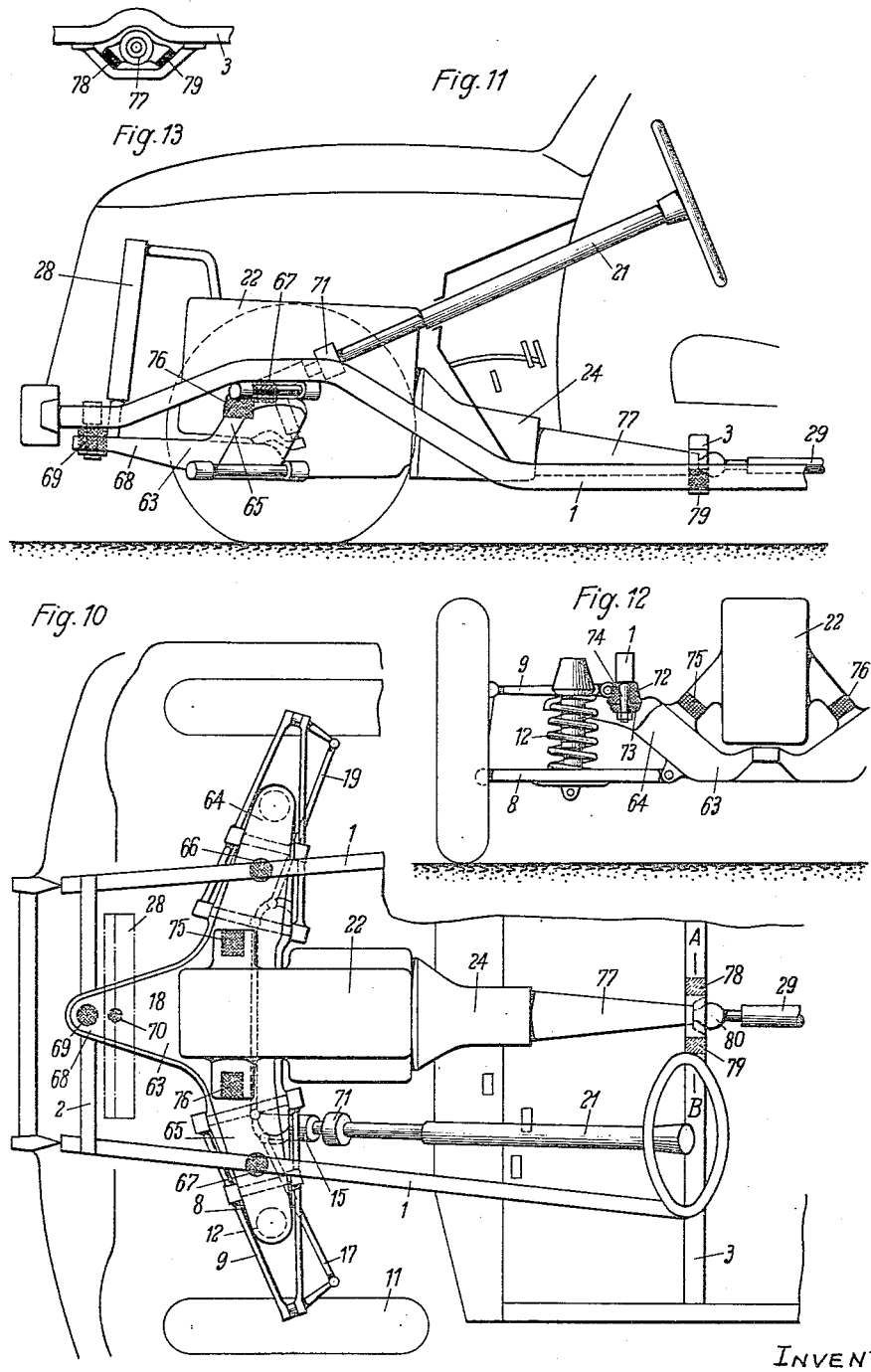
INVENTOR.
FRIEDRICH K. H. NALLINGER
By Dicke and Padlon
ATTORNEYS

United States Patent Office 2,751,992
Patented June 26, 1956

---

2,751,992

UNIT POWER PLANT AND AXLE UNIT SUSPENSION IN MOTOR VEHICLES

Friedrich K. H. Nallinger, Stuttgart, Germany, assignor to Daimler-Benz Aktiengesellschaft, Stuttgart-Unterturkheim, Germany Application July 28, 1950, Serial No. 176,346

Claims priority, application Germany July 30, 1949

27 Claims. (Cl. 180—64)

This invention relates to and has for its object to provide an improvement in power plant unit and wheel assembly in motor vehicles. A general object of the invention is to provide an effective suspension system which facilitates the manufacture and assembly of motor vehicles.

Another object of the present invention is to provide such a suspension system for mounting a power plant unit and wheel assembly in motor vehicles that one and the same unit, eventually under inclusion of other vehicle units as, for example, steering unit, or radiator etc., may be mounted—as one unit—without any trouble into different types of chassis or motor vehicles.

A further object of the present invention is to provide a suspension system assuring noiseless and shock-free support of the unit in the chassis or motor vehicle.

Accordingly, an important feature of the present invention consists in that a mutually auxiliary frame structure or mutually auxiliary frame is provided for both the power plant unit and wheel unit, and the units are only partly supported on this auxiliary frame structure, while in other respects, however, they are supported independently thereof on the remaining portion of the vehicle. According to another feature of the present invention, mounting the power plant unit on the auxiliary frame structure or auxiliary frame may be accomplished by means of interposed resilient members. The auxiliary frame structure or auxiliary frame may be constructed as cross member with separate strut rods or torque members or, by way of example, as a plate-like support which is attached to the remaining portion of the vehicle e. g. at three points.

The employment of a separate auxiliary frame structure or auxiliary frame renders it possible that the power plant unit and wheel assembly—eventually including steering system and other vehicle parts—may be mounted as one preassembled unit on/or to the auxiliary frame structure or auxiliary frame, and then the latter together with the whole unit may be mounted on the vehicle frame or the remaining portion of the vehicle. In connection therewith, the vehicle may have a separate vehicle frame or may be provided with a self-supporting car body or with a vehicle body forming one unit with a frame or frame-work construction.

A further feature of the present invention relates to the employment of a simple box-shaped or plate-shaped cross member as auxiliary frame structure or auxiliary frame, whereby a simple and, nevertheless, sufficiently rigid construction is obtained. The construction, in accordance with a further feature of the present invention, is suitably such that the frame or vehicle body may be put on the auxiliary frame structure which carries the power plant unit and wheel assembly from above, or the whole unit with the auxiliary frame structure or auxiliary frame may be pushed or moved into the frame or the remaining portion of the vehicle from the vehicle ends, accordingly from the front or from the rear of the vehicle. Assembly, power unit changes and repair work are thereby further facilitated.

Shocks and noises resulting from the road may be kept away from the vehicle body to a considerable extent by means of interposed resilient members provided in accordance with another feature of the present invention. The rubber members, employed for this purpose, may be very soft acting and especially large in size in order to obtain an especially effective dampening. Mounting the power plant unit on the auxiliary frame structure or auxiliary frame, on the one hand, and to the remaining vehicle part, on the other hand, may be accomplished by means of rubber mountings of equal or different hardness. By way of example, the mountings on the cross member may be softer than the mountings on the remaining vehicle part. Since a part of the mass, for example, about one half of the power plant unit is supported on the auxiliary frame structure or auxiliary frame, the combined unit of auxiliary frame structure or auxiliary frame and power plant unit amounts to sufficient inertia in relation to the shocks resulting from the road and spring action which acts, for example, in a longitudinal and transverse direction of the vehicle and, therefore, forms an effective dampening mass between the vehicle wheels and vehicle body.

The invention is applicable as well to a front as to a rear wheel assembly and power plant unit. The road wheels of the wheel assembly may be driven or non-driven, and may be dirigible or non-dirigible, whereas the power plant unit may consist preferably of the engine and transmission, eventually also including the axle gearing for the front-wheels, rear engine, or four-wheel drive. However, the engine may also be arranged to be separate from the power unit, partially supported on the auxiliary frame structure or auxiliary frame.

If, in the application to dirigible road wheels, the steering gear and steering links are arranged on the auxiliary frame structure or auxiliary frame, then a steering linkage may be obtained conjointly which is not affected by relative movements between the auxiliary frame structure or auxiliary frame and wheel assembly, on the one hand, and frame and vehicle body, on the other hand. The steering device together with the dirigible road wheels may be quickly and accurately adjusted on the work-bench before the assembly of the vehicle takes place.

In the drawings affixed to this specification and forming part thereof several embodiments of the invention are illustrated schematically by way of example, wherein—

Fig. 1 is a top plan view of the front portion of a motor vehicle chassis with the engine located in the front and driven rear wheels, Fig. 2 is a front view of the chassis according to Fig. 1, Fig. 3 is a top plan view of the front portion of a chassis of a motor vehicle with front-wheel drive, Fig. 4 is a front view of that which is shown in Fig. 3, Fig. 5 is a side view of that which is shown in Fig. 3 with the wheel suspension removed, Fig. 6 is a side view of a somewhat different embodiment of the invention, shown in a view which corresponds to that of Fig. 5, Figs. 7 and 8 are two perspective views of resilient mountings for cross members serving as auxiliary frame structure on a longitudinal member, Fig. 9 is a further detail of the connection of longitudinal and cross member to each other, Fig. 10 is a top plan view of a further embodiment of the invention with an auxiliary frame structure resiliently mounted at three points, Fig. 11 is a side view of the arrangement according to Fig. 10, Fig. 12 is a front view of the arrangement according to Fig. 10, Fig. 13 is a cross-section according to line A—B of Fig. 10, and Figure 14 is a cross sectional view of a modification of the resilient mounting for the cross members shown in Figure 7.

In the embodiment according to Figs. 1 and 2 the frame consists principally of frame side members 1 and, for example, of cross members 2 and 3 and another especially wide, hollow-section cross member 4 which is mounted on this frame, for example, detachably by means of resilient mountings 5. The resilient mountings 5 are suitably of the soft acting type and made in a manner providing an all around flexibility between the cross member 4 and the frame side members 1, i. e. a flexibility in the horizontal as in the vertical direction. The cross member serves as auxiliary frame structure for the wheel assembly and power plant unit. For this purpose the control arms 8 and 9 for the wheel support arm 10 of the dirigible front wheels 11 are supported on the ends of this cross member 4 by means of brackets 6 and 7, the lower control arm 8 being braced by means of the coil spring 12 and shock absorber 13 against the spring seat 14 which, for example, is welded to the bracket 7 for the upper control arm. To the cross member 4 is also fastened the steering gear 15 with the steering-gear arm 16, and the steering action is conveyed by the steering links 17, 18, 19, through the medium of the steering-knuckle arm 20 which is also supported by the cross member 4, to the front wheels 11. Together with the steering gear, the steering column may also be carried by the cross member 4. However, it is more suitable for the attainment of the objects set forth above that the same is fastened to the frame or body and connected with the steering gear by means of a flexible coupling.

The power plant unit consisting of engine 22, clutch housing 23 and change-speed gear 24 is supported at its rear end, for example, detachably by means of rubber mountings 25 on the frame cross member 3, and at its front end by means of rubber mountings 26 on a bracket 27 of the front cross member 4. The radiator 28 is arranged in front of the engine, it being suitable that it is likewise supported on the cross member 4 either directly or by way of the engine 22—eventually also by means of interposed resilient members. The rear wheels are driven through a Cardan shaft 29.

To take or absorb the torque reaction, the cross member 4 is provided with radius rods or torque members 30 on both sides of the frame which extend toward the rear and are, by means of rubber bumpers 31, braced against the frame side members 1 thereby preventing rotational movement of cross member 4 relative to frame members 1 which might otherwise occur as a result of any existing torque. Eventually, one single torque member on the one or the other side may be sufficient for the object in view.

From the foregoing description it will be clear that the control arms 8, 9 for the road wheels, the springs 12 with the spring seats 14, the shock absorbers 13, also the steering system with the steering gear and steering linkage and likewise the radiator 28 are arranged on the auxiliary frame structure or cross member 4. Furthermore, the power plant unit with about half of its weight is also supported on the cross member 4. All of these parts inclusive power plant unit may, therefore, be mounted on the cross member 4 before assembly of the vehicle takes place; in this instance the rear end of the power plant unit may be propped up in a suitable manner. The frame with the longitudinal member 1 and cross members 2, 3, eventually, together with the vehicle body supported on the frame respectively forming one unit with the same, is now placed from above over the preassembled complete unit, comprising power plant unit, auxiliary frame and wheel assembly, which has been assembled in a manner previously described; and then the cross member 4 by means of the rubber mountings 5, the rear bearing support 25 for the power plant unit and the torque member or members 30 are fastened to the frame. And finally, the drive shaft 29 is to be connected to the power plant unit. The connections of the preassembled unit including the auxiliary frame and power plant unit, such as the rubber mountings or bearing supports 5 and 25 may be of the detachable type.

In the embodiment of the present invention according to Figs. 3 to 5 inclusive, the cross member 4, serving as auxiliary frame structure, is mounted on the longitudinal members 1 of the frame, for example, detachably by means of rubber mountings 32 and 33 which are secured against the cross member from above respectively from below, the rubber mounting 33 being held by a cover plate 34 which may be bolted to the longitudinal member 1. In this case, the power plant unit, which with the greater part of its weight is supported on the cross member 4, includes, besides the engine 22, flywheel-and-clutch housing 23 and change-speed gear 24, also the front-axle drive gearing 35 which drives the front wheels 11 through articulated shafts 36. The road wheels are guided through a pair of control arms 37 and 38, arranged one above the other, the upper arm 38 of these control arms is arranged on a bracket 39 of the cross member 4. In contrast to the embodiment according to Figs. 1 and 2, the control arms 37, 38 swing, in the longitudinal direction of the vehicle, about transversely extending oscillation axes and are sprung by means of a torsion bar spring 41 which is arranged within the cross member 4 and, for example, secured at 40. The power plant unit is mounted at its one end to the cross member 4 by means of two support arms 42 and interposed rubber mountings 43 and at its other end to the frame cross member 3 from below, for example, detachably by means of a rear bearing bracket 44 and an interposed rubber mounting 45. By way of example, two lateral radiators 46 are also arranged on the cross member 4. However, also in this case, a front radiator 46' may be provided which, for example, will be carried by the engine 22. The torque member or members 30 extend from the cross member 4 toward the front where, by means of rubber mountings 31, they are braced against the longitudinal member 1 or front cross member 2.

Referring now particularly to the embodiment according to Figs. 3 to 5 inclusive, it will be seen that the drive shafts 36 for the front wheels pass across the frame side members 1 above the same. However, in order to render it also possible to put the frame over the power plant unit from above and place it on the cross member 4 even if the drive shafts 36 are already connected, the arrangement, as clearly shown in Fig. 6, may also be such that the frame side members 1 are joggled so they will not interfere with the drive shafts 36 for the front-wheel drive. The torque member or members 30 may extend toward the front or rear, as shown in Figures 1 and 3 respectively.

As clearly shown in Fig. 7, the box-section cross member 4, serving as auxiliary frame structure, is supported on the longitudinal member or longeron 1 of a self-supporting vehicle body by means of an angular rubber mounting 47, which may also be replaced by two rubber mountings correspondingly arranged at an angle. Fastening may, for example, be accomplished by bolts (not shown in Fig. 7) which are supported in the cross member 4 or in the longitudinal member 1 and pass through the other girder with clear or elastic play thereby providing a detachable connection. The rubber 47 may be kept under initial tension or applied without initial tension. The rubber may also be bonded to metal parts which, for the purpose of connecting the girders with one another, may be secured to the same, as will be more fully described hereinafter in connection with Figure 14. The cross member 4 has an upwardly extending angular extension at its end at 48 and carries thereon, on the one hand, the spring seat 14 and, on the other hand, an (for example, welded on) upper channel-section rail 49 which serves as support for the upper control arm 9, whereas a channel-section rail 51, secured to a bracket 50 (for example, welded thereto), is provided as support for the lower control arm 8. The torque member 30 is secured to the cross member 4, for example, welded thereto, by means of its angular end 52. All of the parts shown in Fig. 7 may consist of sheet-metal stampings.

In the embodiment according to Fig. 8, the longitudinal member or longeron 1 is provided with two pieces of angle iron 53 and 54 which are bolted or welded thereto and embrace the cross member 4 with rubber mountings 55 and 56 interposed. As shocks occur transverse to the direction towards which the vehicle rolls and also in vertical direction, the rubber mountings are subjected to shearing stress and originate a great flexibility, whereas the flexibility against shocks acting in longitudinal direction, which subject the rubber mountings to compressive stress, is relatively small. A bolt 57, which, for example, passes through the cross member 4 with play or with rubber interposed, serves as locking device respectively as device for adjusting the tension of the rubber mountings 55, 56. For this purpose one of the two pieces of angle iron 53, 54 may be shiftably supported on the longeron 1. If necessary, interposed washers may also be used to adjust the initial tension of the rubber mountings.

A similar fastening of longitudinal and cross member is shown in Fig. 9. The bolt 58, being rigidly secured in the longitudinal member 1, passes through the cross member 4 with play. By means of the nut 59 and cap 60 the two rubber mountings 61 and 62 may be put under initial tension. If necessary, a spacer sleeve or the like may be provided which prevents the tension of the rubber from exceeding a certain initial tension. In a similar manner the torque members also may be secured to the longitudinal members or the like.

The embodiment according to Figs. 10 to 12 inclusive, differs from those hereinbefore described mainly in that an essentially three-winged hollow plate 63 is provided as auxiliary frame structure or auxiliary frame. The two bent-up lateral wings 64 and 65 of this hollow plate are used for their resilient fastening to the longitudinal members 1 and also for linking the same to the control arms 8, 9 which, for example, incline toward the rear, and for supporting the coil spring 12. The wing 68, facing toward the front, of the plate 63 is at 69 resiliently and for example detachably, mounted on the front cross member 2 thereby effectively constituting a torque arm to prevent rotation of the auxiliary frame and conjointly with the cross member 2 carries the radiator 28, for example, by means of rubber mountings 70. Likewise the steering gear 15 is supported on the plate 63, whereas the steering column 21 is fastened to the vehicle body and connected to the steering gear 15 through a flexible coupling 71.

As clearly seen, the auxiliary frame structure is, at the three points 66, 67, 69, resiliently suspended at the frame or vehicle body, for example, detachably by means of two rubber mountings 72, 73 each, which are axially arranged and secured to a conical pin 74 which passes through the same. The power plant unit comprising engine 22 and transmission 24 is mounted, on the one hand, on the auxiliary frame structure 63 by means of inclined rubber mountings 75, 76, and, on the other hand, by means of likewise inclined rubber mountings 78, 79 provided at the end of a tubular housing 77 which is attached to the transmission 24, to the frame cross member 3 near the Cardan joint 80 for the Cardan shaft 29. The rubber mountings 78 and 79 may also be of the type providing a detachable connection. In connection therewith, the rubber mountings 75, 76, 78, 79 determine a longitudinal axis of oscillation for the power plant unit with respect to the auxiliary frame structure as also with respect to the frame. It is appropriate that the mountings are softer at the points 75 and 76 than at the points 66 and 67.

Figure 14 illustrates a modification of the resilient connections between the cross member 4 and the longitudinal frame side members 1 from that shown in Figure 7. The cross member 4, as in Figure 7, is provided with an upwardly extending angular extension at its end at 48. Between the cross member 4 and the extension 48, on the one hand, and the lower surface and one side surface of the side frame member 1 on the other hand, an angular rubber mounting 86 is inserted to provide the resilient or elastic support of the box section cross member 4 on the longitudinal member 1. The angular rubber 86 is bonded on both sides thereof to the metal parts 82 and 83, while the metal parts 82 and 83 in turn are secured to the side frame member 1 and to the cross member 4 and extension 48 in any suitable manner, as, for example, by screws and nuts 81, 85 and 84, respectively.

Instead of being mounted at three points, the auxiliary frame structure or auxiliary frame may also be mounted at four or more points to longitudinal and cross members or in any suitable manner to the remaining portion of the vehicle. The auxiliary frame structure or auxiliary frame may be of any shape and it is not an imperative necessity that the same is constructed as hollow girder or hollow body, if such a shape is particularly suitable to take the forces.

The application of the suspension system as embodied in the invention is, of course, not limited to the forms and application illustrated and described herein, I therefore do not wish to be limited to the specific forms and application herein set forth, but wish to reserve to myself any modification or variations that may appear to those skilled in the art and fall within the scope of the following claims:

What I claim is:

1. In a motor vehicle, a vehicle superstructure, an auxiliary frame structure having torque members fastened thereto at one end thereof and extending in the longitudinal direction, a pair of vehicle wheels, means for independently guiding said wheels with respect to said auxiliary frame structure, means for springing said wheels with respect to said auxiliary frame structure, means for resiliently connecting said auxiliary frame structure with said vehicle superstructure, and means for resiliently connecting the opposite ends of said torque members with said vehicle superstructure.

2. In a motor vehicle, the combination according to claim 1, wherein said auxiliary frame structure consists essentially of one cross member to which said torque members are fastened; wherein two longitudinally extending bearing members are connected with said cross member on each side of the vehicle; and wherein said means for independently guiding said road wheels comprises two links arranged one above the other and being pivotally connected with said bearing members.

3. In a motor vehicle, a vehicle superstructure, a wheel assembly comprising: road wheels, guide members and spring members for said road wheels; an auxiliary frame structure for supporting said wheel assembly consisting essentially of a hollow cross member and torque members attached at one end thereof to said auxiliary frame structure and extending in the longitudinal direction of the vehicle, said spring members being arranged in the interior of said cross member, and resilient means for securing said auxiliary frame structure including the opposite ends of said torque members to said vehicle superstructure.

4. In a motor vehicle, the combination according to claim 3, wherein said spring members are developed as torsion bars.

5. In connection with a motor vehicle, a superstructure with at least two lateral longitudinal members and cross members, an auxiliary supporting member rigid in itself, a wheel assembly, elastic means for elastically supporting said wheel assembly on said auxiliary supporting member, elastic means for elastically detachably attaching said auxiliary supporting member to said superstructure of the vehicle at three points, namely, on each one of the two longitudinal members and on one cross member, a driving unit, elastic means for partially supporting said driving unit on said auxiliary supporting member, and elastic means for partially supporting the driving unit directly on the superstructure of the vehicle independently of said auxiliary supporting member.

6. In connection with a motor vehicle, the combination in accordance with claim 5 in which the auxiliary supporting member is developed essentially as a pressed metal sheet having two non-parallel side arms and a third supporting arm joining said two side arms.

7. In connection with a motor vehicle, a vehicle superstructure, a rigid auxiliary supporting member, a wheel assembly comprising a pair of wheels arranged opposite each other, wheel guiding members and wheel suspension means for said wheels, with means for supporting the wheel guiding members and the wheel suspension means on said auxiliary supporting member, elastic means for elastically attaching said auxiliary supporting member to said vehicle superstructure, a driving unit, means for partially supporting said driving unit on said auxiliary supporting member, and elastic means for partially elastically supporting said driving unit directly on said superstructure of the vehicle independently of said auxiliary supporting member.

8. In a motor vehicle, the combination comprising a superstructure having a front end extending longitudinally at least to one end of the vehicle, an auxiliary supporting member rigid in itself, elastic means for elastically detachably securing said auxiliary supporting member to said superstructure at three points, one of said points being located on the front end of said superstructure and the other two points being located on both sides of the vehicle at a distance from said first point in the longitudinal direction of the vehicle, a wheel assembly comprising a pair of wheels arranged opposite each other, wheel guiding members and wheel spring means for connecting and supporting said wheels on said auxiliary supporting member, a driving unit, elastic means for elastically partially supporting said driving unit on said auxiliary supporting member in such a manner that the end of the driving unit supported by said auxiliary supporting member extends into the triangle formed by said three points, the two last points being located on both sides of the driving unit.

9. In a motor vehicle, the combination according to claim 5 wherein said auxiliary frame structure is a hollow body built-up of stamped sheet metal parts.

10. In a motor vehicle, the combination of a rigid main frame, an auxiliary frame, elastic means for securing said auxiliary frame to said main frame, a power plant unit, further resilient means for supporting one end of said power plant unit on said auxiliary frame, and still further resilient means for directly supporting the other end of said power plant unit on said main frame independently of said auxiliary frame, said auxiliary frame extending only over a portion of the length of said power plant unit in the longitudinal direction of the vehicle, and said other end of said power plant unit supported on said main frame being at a greater distance from said auxiliary frame than said length portion.

11. In a motor vehicle, a vehicle superstructure, an auxiliary frame structure having at least one torque arm secured at one end thereof to said auxiliary frame structure and extending in the longitudinal direction, a pair of vehicle wheels, means for independently suspending said wheels with respect to said auxiliary frame structure to enable an independent springing movement of said wheels in an up and down direction, means for springing said wheels with respect to said auxiliary frame structure, means for resiliently connecting said auxiliary frame structure with said vehicle superstructure, and means for resiliently connecting the opposite end of said torque arm with said vehicle superstructure.

12. In connection with a motor vehicle, a vehicle superstructure, a rigid auxiliary supporting member, a wheel assembly comprising a pair of wheels arranged opposite each other, wheel guiding members and wheel suspension means for said wheels with means for supporting said wheel guiding members and said wheel suspension means at said auxiliary supporting member, detachable elastic attachment means for attaching said auxiliary supporting member to said vehicle superstructure, a drive unit, means rigidly connected to said auxiliary supporting member for absorbing torque reactions on said last-named member about an axis transverse to the direction of travel, said last-mentioned means comprising at least one torque member with one end thereof secured to said auxiliary supporting member and the opposite end generally opposite said auxiliary supporting member, said opposite end supporting said member against said vehicle superstructure, means for partially supporting said drive unit on said auxiliary supporting member, and detachable means for partially supporting the driving unit on said vehicle superstructure.

13. In a motor vehicle, the combination of a rigid main frame, an auxiliary frame, elastic means for securing said auxiliary frame to said main frame, a power plant unit, further resilient means for supporting one end of said power plant unit on said auxiliary frame, still further resilient means for directly supporting the other end of said power plant unit on said main frame independently of said auxiliary frame, one pair of wheels, supporting means for said wheels, and means for securing said last-named supporting means to said auxiliary frame only.

14. In a motor vehicle, a vehicle superstructure, a rigid auxiliary supporting member, a wheel assembly comprising a pair of wheels arranged opposite each other, wheel guiding members and wheel suspension means for said wheels with means for supporting said wheel guiding members and said wheel suspension means at said auxiliary supporting member, detachable elastic attachment means for attaching said auxiliary supporting member to said vehicle superstructure, a driving unit, means on said auxiliary supporting member for absorbing torque reactions on said last-named member about an axis transverse to the direction of travel, said last-mentioned means defining a lever arm extending in the longitudinal direction of the vehicle with respect to said attachment means and elastically braced against said vehicle superstructure to thereby support said auxiliary supporting member against said vehicle superstructure, means for partially supporting said driving unit on said auxiliary supporting member, and detachable means for partially supporting said driving unit on said vehicle superstructure.

15. In a motor vehicle, the combination according to claim 14, wherein said auxiliary supporting member is a frame cross member extending essentially transversely to the direction toward which the vehicle rolls.

16. In a motor vehicle, the combination according to claim 14, wherein said pair of wheels are driven road wheels, further comprising transverse articulated drive shafts for driving said road wheels from said drive unit, and wherein said vehicle superstructure comprises frame side members which are so formed above said shaft as to provide a clearance for said articulated drive shafts, said frame side members serving for connecting said auxiliary frame structure to said vehicle superstructure.

17. In a motor vehicle, the combination according to claim 14, wherein said means for partially supporting said driving unit on said auxiliary supporting member is elastic.

18. In a motor vehicle the combination according to claim 17, wherein said superstructure extends beyond said auxiliary supporting member, and wherein said auxiliary supporting member is attached to said superstructure in such a way that it may be secured thereto from below.

19. In a motor vehicle, the combination according to claim 17, wherein said auxiliary frame structure is a hollow body built-up of stamped sheet metal parts.

20. In a motor vehicle, the combination according to claim 7, wherein said pair of wheels are dirigible wheels, further comprising a steering unit for said dirigible wheels, said steering unit being carried by the unit consisting of said auxiliary supporting member, said wheel assembly and said driving unit.

21. In a motor vehicle, the combination according to claim 7, further comprising a radiator for said driving unit, said radiator being carried by the unit consisting of said auxiliary supporting member, said wheel assembly and said driving unit.

22. In a motor vehicle the combination according to claim 7, further comprising means on said auxiliary supporting member for absorbing torque reactions on said last-named member about an axis transverse to the direction of travel, said last named means defining a lever arm rigidly secured at one end thereof to said auxiliary supporting member and extending in the longitudinal direction of the vehicle with respect to said first mentioned elastic means, and means for elastically securing the opposite end of said lever arm to said vehicle superstructure to thereby support said auxiliary supporting member against said vehicle superstructure.

23. In a motor vehicle the combination according to claim 22 wherein said driving unit is supported at the end thereof located toward the end of the vehicle on said auxiliary supporting member while the other end of said driving unit is supported on said vehicle superstructure.

24. In a motor vehicle, the combination according to claim 22 wherein said auxiliary supporting member is developed as a rigid crosswise supporting member, and is attached from below to the superstructure of the vehicle.

25. In a motor vehicle the combination according to claim 22 wherein said first-mentioned elastic means have lesser flexibility than the two last-mentioned elastic means.

26. In a motor vehicle the combination according to claim 22 wherein said drive unit comprises at least an engine and a change-speed gear, the latter being provided with a tubular extension for the resilient mounting thereof to said vehicle superstructure.

27. In connection with a motor vehicle, a vehicle superstructure, a rigid auxiliary supporting member, a wheel assembly comprising a pair of wheels arranged opposite each other, wheel guiding members and wheel suspension means for said wheels, means for supporting said wheel guiding members and said wheel suspension means on said auxiliary supporting member, elastic means for elastically attaching said auxiliary supporting member to said vehicle superstructure, a driving unit, means for partially supporting said driving unit on said auxiliary supporting member, and elastic means for partially elastically supporting said driving unit directly on said superstructure of the vehicle independently of said auxiliary supporting member, said auxiliary supporting member including means for absorbing torque reaction thereon about an axis transverse to the direction of travel, said last-named means forming a lever arm rigidly secured at one end thereof to said auxiliary supporting member and extending in the longitudinal direction of the vehicle with respect to said first-mentioned elastic means, and means for elastically securing the opposite end of said lever arm to said vehicle superstructure to thereby support said auxiliary supporting member against said vehicle superstructure, the means for elastically attaching said auxiliary supporting member to said vehicle superstructure and the means for elastically securing said opposite end of the lever arm to said vehicle superstructure forming an elastic support at three points.

References Cited in the file of this patent

UNITED STATES PATENTS

| | | |
|---|---|---|
| 1,817,633 | Lovejoy | Aug. 4, 1931 |
| 1,948,745 | Curtiss | Feb. 27, 1934 |
| 2,015,682 | Kliesrath | Oct. 1, 1935 |
| 2,053,575 | Olley | Sept. 8, 1936 |
| 2,058,580 | Evans | Oct. 27, 1936 |
| 2,081,213 | Anibal | May 25, 1937 |
| 2,084,320 | Coleman | June 22, 1937 |
| 2,129,829 | Dunn | Sept. 13, 1938 |
| 2,351,650 | Wulff | June 20, 1944 |
| 2,611,625 | Kishline | Sept. 23, 1952 |
| 2,631,681 | Utz et al. | Mar. 17, 1953 |
| 2,633,203 | Paton | Mar. 31, 1953 |

FOREIGN PATENTS

| | | |
|---|---|---|
| 427,891 | Great Britain | Apr. 24, 1935 |
| 435,392 | Great Britain | Sept. 16, 1935 |